United States Patent
Landwehr et al.

(10) Patent No.: US 10,577,950 B2
(45) Date of Patent: Mar. 3, 2020

(54) BOND LAYER FOR CERAMIC OR CERAMIC MATRIX COMPOSITE

(71) Applicant: Rolls-Royce Corporation, Indianapolis, IN (US)

(72) Inventors: Sean E. Landwehr, Avon, IN (US); Michael Cybulsky, Indianapolis, IN (US); Kang N. Lee, Strongsville, OH (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 15/873,406

(22) Filed: Jan. 17, 2018

(65) Prior Publication Data

US 2018/0202300 A1 Jul. 19, 2018

Related U.S. Application Data

(60) Provisional application No. 62/447,738, filed on Jan. 18, 2017.

(51) Int. Cl.
*C04B 41/52* (2006.01)
*F01D 5/28* (2006.01)
(Continued)

(52) U.S. Cl.
CPC ........ *F01D 5/288* (2013.01); *C04B 35/62807* (2013.01); *C04B 35/62828* (2013.01); *C04B 35/62852* (2013.01); *C04B 35/62855* (2013.01); *C04B 35/62873* (2013.01); *C04B 41/009* (2013.01); *C04B 41/5022* (2013.01); *C04B 41/5024* (2013.01); *C04B 41/5096* (2013.01); *C04B 41/52* (2013.01); *C04B 41/89* (2013.01); *C23C 24/08* (2013.01); *F23R 3/007* (2013.01)

(58) Field of Classification Search
CPC ......... F01D 5/288; C04B 41/89; C04B 41/52; C04B 41/009; C04B 35/62873; C04B 35/62807; C04B 35/62828; C04B 35/62852; C04B 35/62855; C04B 41/5022; C04B 41/5024; C04B 41/5096; C23C 24/08; F23R 3/007
See application file for complete search history.

(56) References Cited

U.S. PATENT DOCUMENTS 5,618,763 A 4/1997 Frank et al.
5,985,470 A * 11/1999 Spitsberg .............. C04B 41/009
428/469

(Continued)

FOREIGN PATENT DOCUMENTS

EP 3070073 A1 9/2016
WO WO-2014-199075 * 12/2014 ............. C04B 41/85

OTHER PUBLICATIONS

Hamilton et al., "Properties of Zinc Borosilicate Glasses," Journal of Research of the National Bureau of Standards, Research Paper 2930, vol. 62, No. 2, Feb. 1959, 4 pp.

(Continued)

*Primary Examiner* — Jonathan C Langman
(74) *Attorney, Agent, or Firm* — Shumaker & Sieffert, P.A.

(57) ABSTRACT

An article having a substrate that includes a ceramic or a ceramic matrix composite, a bond layer on the substrate that includes silicon metal and a boria stabilizing agent, and at least one additional layer on the bond layer.

17 Claims, 2 Drawing Sheets

(51) Int. Cl.
*C04B 41/89* (2006.01)
*C04B 41/00* (2006.01)
*C23C 24/08* (2006.01)
*C04B 35/628* (2006.01)
*F23R 3/00* (2006.01)
*C04B 41/50* (2006.01)

(56) References Cited

U.S. PATENT DOCUMENTS

| | | | |
|---|---|---|---|
| 6,077,605 A | 6/2000 | McGowan et al. | |
| 6,387,456 B1* | 5/2002 | Eaton, Jr. | C04B 41/009 |
| | | | 427/450 |
| 6,465,090 B1 | 10/2002 | Stowell et al. | |
| 6,759,151 B1 | 7/2004 | Lee | |
| 6,902,836 B2 | 6/2005 | Eaton et al. | |
| 7,063,894 B2 | 6/2006 | Sun et al. | |
| 7,354,651 B2 | 4/2008 | Hazel et al. | |
| 7,368,164 B2 | 5/2008 | Stowell et al. | |
| 7,442,444 B2 | 10/2008 | Hazel et al. | |
| 8,124,252 B2 | 2/2012 | Cybulsky et al. | |
| 2002/0035025 A1 | 3/2002 | Schweiger et al. | |
| 2004/0234783 A1* | 11/2004 | Eaton | C04B 41/009 |
| | | | 428/446 |
| 2005/0261121 A1 | 11/2005 | Lehman et al. | |
| 2006/0167138 A1 | 7/2006 | Ishii et al. | |
| 2006/0210800 A1 | 9/2006 | Spitsberg et al. | |
| 2006/0280952 A1 | 12/2006 | Hazel et al. | |
| 2010/0080984 A1 | 4/2010 | Lee | |
| 2011/0027517 A1 | 2/2011 | Kirby et al. | |
| 2014/0199163 A1* | 7/2014 | Lee | C23C 28/04 |
| | | | 415/174.4 |
| 2016/0130188 A1* | 5/2016 | Louchet | C04B 41/4527 |
| | | | 428/448 |

OTHER PUBLICATIONS

Response to Extended Search Report dated May 16, 2018, from counterpart European Application No. 18150514.0, filed Jan. 22, 2019, 32 pp.

Extended Search Report from counterpart European Application No. 18150514.0, dated May 16, 2018, 7 pp.

Intent to Grant dated Apr. 17, 2019, from counterpart European Application No. 18150514.0, 23 pp.

Examination Report from counterpart European Application No. 18150514.0, dated Sep. 11, 2019, 3 pp.

Response to Examination Report dated Sep. 11, 2019, from counterpart European Application No. 18150514.0, filed Nov. 11, 2019, 4 pp.

Notice of Intent to Grant and Text Intended to Grant from counterpart European Application No. 18150514.0, dated Dec. 3, 2019, 23 pp.

* cited by examiner

BOND LAYER FOR CERAMIC OR CERAMIC MATRIX COMPOSITE

This application claims the benefit of U.S. Provisional Application No. 62/447,738 filed Jan. 18, 2017, which is incorporated herein by reference in its entirety.

TECHNICAL FIELD

The invention relates to coatings for high-temperature mechanical systems, such as gas turbine engines, and more particularly to coatings for ceramic matrix composites.

BACKGROUND

The components of high-temperature mechanical systems, such as, for example, gas-turbine engines, typically operate in severe environments. For example, hot section components of gas turbine engines, e.g., turbine blades and/or vanes, exposed to hot gases in commercial aeronautical engines may experience surface temperatures of greater than 1,000° C. Ceramic or ceramic matrix composite (CMC) materials may be useful in such high temperature environments, but some ceramics or CMCs may react with some elements and compounds present in the operating environment or certain layers or portions of the substrate component. Reaction with such elements or compounds may result in degradation of the ceramic or CMC substrate leading to a reduced lifespan. In some examples, a ceramic or CMC substrate may be coated with an environmental barrier coating, which may reduce exposure of the substrate to elements and compounds present in the operating environment of high temperature mechanical systems.

SUMMARY

The disclosure relates to coatings for a ceramic or CMC substrate that include a bond layer having a silicon metal (e.g., elemental silicon) and a boria stabilizing agent. In some embodiments, the inclusion of the boria stabilizing agent may improve the useful life of the ceramic or CMC substrate.

In some examples, the disclosure describes an article that includes a substrate comprising a ceramic or a ceramic matrix composite, a bond layer on the substrate that includes silicon metal and a boria stabilizing agent, and at least one additional layer on the bond layer.

In some examples, the disclosure describes a technique that includes forming a bond layer including silicon metal and a boria stabilizing agent on a substrate that includes a ceramic or ceramic matrix composite and boron, boria, or a boron containing species that oxidizes to form boria, and forming at least one additional layer on the bond layer.

In some examples, the disclosure describes an article that includes a substrate including a ceramic or a ceramic matrix composite, a bond layer on the substrate that includes silicon metal and at least one of a zinc silicate, tantalum silicate, niobium silicate, molybdenum silicate, and tungsten silicate; and an environmental barrier coating (EBC) on the bond layer.

DETAILED DESCRIPTION

Figure 1:
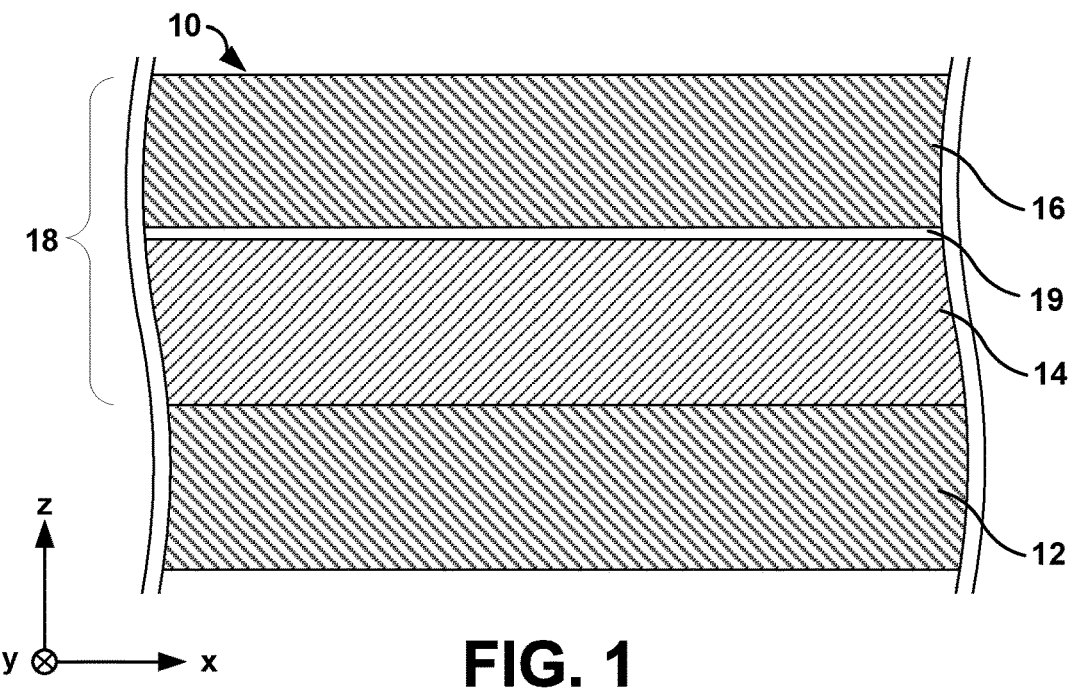
FIG. 1 is a cross-sectional diagram of an example article including an example bond layer.

The disclosure describes coating systems for a ceramic or ceramic matrix composite (CMC) article. The coating systems may include a bond layer that includes silicon metal (e.g., elemental silicon) and a boria stabilizing agent. The bond layer may act as an adhesion layer between the underlying ceramic or CMC substrate and at least one additional layer on the bond layer, such as an environmental barrier coating (EBC). Due to the high temperature environments in which the articles are used, the bond layer may behave as a thermal compatibility layer in which the bond layer has a coefficient of thermal expansion (CTE) that is between the CTE of the ceramic or CMC substrate and the CTE of the at least one additional layer on the bond layer thereby improving the adherence of the layers in high temperature environments.

While ceramic or CMC substrates may exhibit good properties for high temperature applications, one drawback with ceramic or CMC components is their lack of environmental durability in combustion environments. For example, due to the high temperatures within combustion environments, certain elements and compounds can migrate or diffuse between the different layers of the article, adversely affecting the properties of the respective layer(s) or reacting with other compounds of the different layers. In some examples, the reactions may result in the slow regression or spallation of the outer layers, thereby diminishing the useful life of the article.

In some examples, protective coatings such as EBCs may be applied to ceramic or CMC components to reduce and slow the ingress of deleterious elements and compounds such as, for example, water vapor, calcia-magnesia-alumina-silicate (CMAS), or the like, thereby increasing the useful life of the CMC. Even with the presence of such protective coatings, however, the diffusion of certain molecules, such as oxygen, through the coating and into the article can still occur. For example, oxygen that diffuses through the EBC can react with the silicon metal (e.g. elemental silicon) bond layer to form an oxide layer, e.g., silicon dioxide (silica; $SiO_2$), at the interface between the bond layer and the EBC. While some production of silica scale may provide some benefits, the unchecked growth of the oxide layer may result in damage to the article. Examples of deleterious effects produced from the silica scale may include, for example, thermal expansion mismatches between the bond layer and the EBC, which may result in mechanical stress at the interface and, ultimately, the spallation of the EBC, thereby exposing the ceramic or CMC to water vapor.

In some examples, the growth rate of the silica scale and physical properties may be affected by the diffusion of certain elements or compounds into the bond layer from other portions of the article, such as the ceramic or CMC substrate. One such compound may include boria (e.g., boron trioxide ($B_2O_3$)). For example, the underlying ceramic or CMC substrate may include trace amounts of boria or boron as a consequence of the base components and production process. During operation of the article in a high temperature environment, the boria present within the ceramic or CMC substrate, or boron that subsequently oxidizes to form boria, may migrate or diffuse from the substrate into one or more of the coating layers, such as the bond layer. The boria may then interact with the silica scale that forms at the interface between the silicon-based bond coat and the adjacent outer layer (e.g., an EBC). In some examples, the boria may reduce the viscosity of the silica scale, catalyze the growth of the silica scale, transform the silica scale from an otherwise amorphous state to an at least partially crystalline structure, or the like; ultimately leading to the degradation of the coating. In some examples, the resultant degradation induced from the migrating boria may cause delamination, spallation, damage, embrittlement, or cracking of the coating, thereby reducing the service life of the article.

In some examples, by including the boria stabilizing agent within the bond coat, the boria that diffuses into the bond layer will interact and react with the boria stabilizing agent to form a stabilized boron complex (e.g., a metal-borosilicate glass). In some examples, the stabilized boron complex may have an increased viscosity at the temperatures experienced by the bond layer or an increased melting point compared to boria, thereby inhibiting the stabilized boron complex from migrating into one or more of the outer coating layers. In some examples, the stabilized boron complex may also help reduce the presence of cristobalite which can cause deleterious effects to the bond coat including, for example, spallation. As used herein, a "boria stabilizing agent" is an additive to the bond layer that will reacts with boria to inhibit further migration of the boria into the outer coating layers of the ceramic or CMC article. Example boria stabilizing agents may include zinc silicate, zirconium silicate, hafnium silicate, tantalum silicate, niobium silicate, molybdenum silicate, tungsten silicate, or combinations thereof. In some examples, the boria stabilizing agent may include at least one of zinc silicate, tantalum silicate, niobium silicate, molybdenum silicate, or tungsten silicate. In some examples, the boria stabilizing agent may include at least zinc silicate.

FIG. 1 is a conceptual illustration of an example article 10 including a substrate 12 and coating 18, which includes a bond layer 14 on substrate 12, and at least one additional layer 16 applied on bond layer 14. Substrate 12 may include a ceramic or a CMC.

As described above, ceramic or CMC components are useful in a variety of high temperature applications, including, for example, gas turbine engines. Ceramic or CMC components have excellent high temperature mechanical, physical, and chemical properties which allow gas turbine engines to operate at high temperatures. In some examples, article 10 may represent a seal segment, a blade track, an airfoil, a blade, a vane, a combustion chamber liner, or the like, of a gas turbine engine.

In some examples, substrate 12 may include one or more ceramic materials including, for example, silicon carbide (SiC), silicon nitride ($Si_3N_4$), silicon oxynitride, and silicon aluminum oxynitride; a Si-containing metal alloy, such as molybdenum-silicon alloys (e.g., $MoSi_2$) and niobium-silicon alloys (e.g. $NbSi_2$); and an oxide-oxide CMC. In examples in which substrate 12 includes a CMC, substrate 12 may include a matrix material and a reinforcement material. The matrix material may include a ceramic material, such as, for example, silicon metal (e.g., elemental silicon), SiC, or other ceramics described above. CMCs may further include a reinforcement material, such as ceramic fibers, whiskers, platelets, or chopped or continuous fibers as monofilaments or multifilament weaves. In some examples, the reinforcement materials may include SiC, C, other ceramic materials described herein, or the like. For example, substrate 12 may include a SiC—SiC ceramic matrix composite.

Substrate 12 may be manufactured using any suitable technique including, for example, chemical vapor deposition (CVD), chemical vapor infiltration (CVI), polymer impregnation and pyrolysis (PIP), liquid polymer infiltration (LPI), slurry infiltration, liquid silicon infiltration (LSI), melt infiltration (MI), hot press sintering, combinations thereof, or other techniques. In some examples, CMC substrate 12 may include impurities or additives having, for example, boron, boria, or boron containing species that oxidize to form boria during use.

Article 10 includes bond layer 14 on substrate 12. Bond layer 14 may include silicon metal (e.g., elemental silicon) and a boria stabilizing agent. Bond layer 14 may improve adhesion of at least one additional layer 16 to substrate 12 compared to examples in which article 10 does not include bond layer 14. Further, by including bond layer 14 between substrate 12 and at least one additional layer 16, diffusion of elements or compounds from substrate 12 to the outer layers of article 10, and vice versa, may be reduced. For example, substrate 12 may include relatively volatile compounds such as boron trioxide (e.g., boria) that may detrimentally affect one or more layers of coating 18. As described above, during operation of article 10 in high temperature environments, the trace amounts of boron or boria present within substrate 12 may begin to migrate or diffuse from substrate 12 into one or more of the outer coating layers of article 10. In the absence of the boria stabilizing agent in bond layer 14, the boria may interact with compounds present in the layers of coating 18, including, for example, the silica scale 19 that may naturally form at the interface between bond layer 14 and at least one additional layer 16. In some such examples, the boria may reduce the viscosity of silica scale 19, catalyze the growth of the silica scale, transform at least a portion of the silica scale from an otherwise amorphous state to a crystalline structure, or the like; ultimately leading to the degradation of the outer coating layers. For example, boria from substrate 12 may change the amorphous structure of silica scale 19 to a crystalline cristobalite structure causing embrittlement the scale layer or a significant volume change in the cristobalite structure during thermal cycling. This may cause portions of silica scale 19 to crack. In some examples, the resultant degradation induced from the migrating boria may cause delamination, spallation, damage, embrittlement, or cracking of bond layer 14, silica scale 19, or at least one additional layer 16, thereby reducing the service life of article 10.

The boria stabilizing agent may inhibit the migration of boria from substrate 12 into outer layers of article 10 (e.g., at least one additional layer 16). For example, the boria stabilizing agent within bond layer 14 may interact with or react with the boria as the boria diffuses through bond layer 14 to form a stabilized boron complex. In some examples, the stabilized boron complex may have an increased viscosity compared to boria, thereby inhibiting the boria molecules from migrating to the interface between bond layer 14 and additional layer 16, or beyond. Additionally, or alternatively, the stabilized boron complex may form an amorphous complex that may reduce crystallization in a silica scale formed on bond layer 14, form a complex with a relatively high melting point compared boron silicon oxide, or improve creep resistance of bond layer 14.

In some examples the boria stabilizing agent may include at least one of zinc silicate, tantalum silicate, niobium silicate, molybdenum silicate, or tungsten silicate. The boria stabilizing agent may be selected so that the boria stabilizing agent, as well as the resultant stabilized boria complex, have a CTE that is compatible with the silicon metal of bond layer 14 and does not significantly alter the coefficient of thermal expansion (CTE) compatibility between the bond layer 14 and either the adjacent substrate 12 or additional layer 16. In some examples, the CTE of the boria stabilizing agent, as well as the resultant stabilized boria complex, may be between about 0.1 ppm/° C. and about 6 ppm/° C. at room temperature (e.g., about 25° C.), in some examples between about 2 ppm/° C. and about 5 ppm/° C. Depending on the composition of bond layer 14, the layer 14 may have a CTE between about 1 ppm/° C. and about 9 ppm/° C. at room temperature, in some examples between about 2 ppm/° C. and about 6 ppm/° C. at room temperature, and in some examples between about 3 ppm/° C. and about 5 ppm/° C. at room temperature. The CTE for a layer may be determined using any suitable technique including, for example, using a push-rod dilatometer testing procedure as set forth and described by ASTM Test Method E228.

Additionally, or alternatively, the boria stabilizing agent should be selected so that the resultant stabilized boria complex exhibits a relatively high melting point (e.g., greater than about 1400° C.) to prevent melting or spallation of bond layer 14 during operation. In some examples, the boria stabilizing agent may include zinc silicate (e.g., $Zn_2SiO_4$ or willemite). Zinc silicate has a relatively low CTE (e.g., about 0 to 2 ppm/° C. at RT) which is compatible with the CTE of silicon metal (e.g., about 2.6 ppm/° C. at RT) of bond layer 14. Additionally, the zinc silicate may react with boria to form a zinc borosilicate glass complex having a relatively high melting point (e.g., about 1500° C.), thereby significantly inhibiting the boria from migrating into other layers of article 10 as well as preventing bond layer 14 from melting or delaminating during operation. In some examples, the zinc silicate may be added with the silicon metal used to form bond layer 14 in an amount of about 2 percent by volume (vol. %) to about 40 vol. %.

In some examples, bond layer 14 may also include zirconium silicate or hafnium silicate in an amount of about 2 vol. % to about 40 vol. %. In such examples, the zirconium silicate or hafnium silicate may help increase the creep resistance of bond layer 14.

In some examples, bond layer 14 may include one or more adhesion promoters including, for example, a transition metal carbide, a transition metal boride, or a transition metal nitride; mullite (aluminum silicate, $Al_6Si_2O_{13}$), silica, silicide, silicon carbide, a rare earth silicate, a rare earth oxide, or the like. The presence of an adhesion promoter (e.g., SiC) within bond layer 14 may improve the adherence of bond layer 14 to substrate 12 or to the at least one additional layer 16. Additionally, the adhesion promoter may modify the CTE of bond layer 14 to allow for better CTE compatibility between the bond layer 14 and substrate 12 or between bond layer 14 and additional layer 16.

Bond layer 14 may be formed on substrate 12 using any suitable technique including, for example, thermal spraying (e.g., plasma spraying), physical vapor deposition (PVD), electron beam physical vapor deposition (EB-PVD), directed vapor deposition (DVD), chemical vapor deposition (CVD), cathodic arc deposition, slurry deposition, sol-gel deposition, electrophoretic deposition, and combinations thereof. In some examples, the thickness of bond layer 14 measured in the z-axis direction of FIG. 1 may be selected based at least in part on the application technique. For example, plasma spraying may deposit bond layer 14 as a less dense layer, and may be used form a relatively thick diffusion barrier 14, e.g. on the order of about 75 micrometers (μm) or more. As another example, CVD may deposit bond layer 14 as a relatively dense layer, and may be used to form a relatively thin bond layer 14, e.g., on the order of 10 μm. In some examples, bond layer 14 may be relatively thin to reduce CTE mismatches between substrate 12 and one or more additional layers 16 resulting in unwanted stress between the layers. In some examples, thickness of bond layer 14 may be between about 10 μm and about 350 μm.

Article 10 also includes at least one additional layer 16 formed on bond layer 14. In some examples, at least one additional layer 16 may represent a combination of layers formed on bond layer 14. In some examples, at least one additional layer 16 may be in direct contact with diffusion barrier 14, as shown in FIG. 1, while in other examples, at least one additional layer 16 may be separated from bond layer 14 by the presence of one or more intermediate layers. In some examples, the intermediate layers may be deposited intentionally, while in other examples the intermediate layers may form during operation of article 10 (e.g., the growth of a silicon dioxide scale layer). The use of the description of one layer being "on" another, as used herein, is meant to encompass both the configurations where layers are in direct contact (e.g., directly adjacent) or where the layers are separated by one or more intermediate layers (e.g., indirectly adjacent).

In some examples, at least one additional layer 16 may include an environmental barrier coating (EBC), which may provide environmental protection, thermal protection, and/or CMAS-resistance to article 10. In some examples, an EBC layer may include constituents and a physical construction selected to reduce contact of underlying layers with chemical species present in the environment in which article 10 is used, such as water vapor, calcia-magnesia-aluminasilicate (CMAS; a contaminant that may be present in intake gases of gas turbine engines), or the like. The EBC layer may include at least one of mullite, barium strontium aluminosilicate (BSAS), barium aluminosilicate (BAS), strontium aluminosilicate (SAS), a rare earth oxide, a rare earth silicate, an aluminosilicate, or an alkaline earth aluminosilicate. For example, the EBC layer may include at least one rare earth monosilicate ($RE_2SiO_5$, where RE is a rare earth element), at least one rare earth disilicate ($RE_2Si_2O_7$, where RE is a rare earth element), or combinations thereof. The rare earth element in the rare earth oxide, the rare earth monosilicate, or rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the rare earth oxide includes an oxide of at least one of Yb, Y, Gd, or Er.

In some examples, the EBC layer may include at least one rare earth oxide and alumina, at least one rare earth oxide and silica, or at least one rare earth oxide, silica, and alumina. In some examples, the EBC may include an additive in addition to the primary constituents of the EBC. For example, the EBC may include at least one of $TiO_2$, $Ta_2O_5$, $HfSiO_4$, alumina ($Al_2O_3$), an alkali metal oxide, or an alkaline earth metal oxide. The additive may be added to the EBC layer to modify one or more desired properties of layer. For example, the additive components may increase or decrease the reaction rate of additional layer 16 with CMAS (a contaminant that may be present in intake gases of gas turbine engines), may modify the viscosity of the reaction product from the reaction of CMAS and constituent(s) of the EBC layer, may increase adhesion of at least one additional layer 16 to bond layer 14 or other layers forming at least one additional layer 16, may increase or decrease the chemical stability of the EBC layer, or the like. In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC that includes zirconia and/or hafnia.

In some examples, the EBC layer may have a dense microstructure, a columnar microstructure, or a combination of dense and columnar microstructures. A dense microstructure may be more effective in preventing the infiltration of CMAS and other environmental contaminants, while a columnar microstructure may be more strain tolerant during thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, at least one additional layer 16 with a dense microstructure may have a porosity of less than about 20 vol. %, such as less than about 15 vol. %, less than 10 vol. %, or less than about 5 vol. %, where porosity is measured as a percentage of pore volume divided by total volume of the EBC layer.

Additionally, or alternatively, at least one additional layer 16 may include an outer abradable layer. The abradable layer may include at least one of a rare earth oxide, a rare earth silicate, an aluminosilicate, or an alkaline earth aluminosilicate. For example, the abradable layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof.

In some examples the abradable layer may be porous. Porosity of the abradable layer may reduce a thermal conductivity of the abradable layer and/or may affect the abradability of the layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled using coating material additives and/or processing techniques to create the desired porosity. In some examples, substantially closed pores may be desired. In some examples, a coating material additive that melts or burns at the use temperatures of the component (e.g., a blade track), may be incorporated into the coating material that forms the abradable layer. The coating material additive may include, for example, graphite, hexagonal boron nitride, or a polymer such as a polyester, and may be incorporated into the coating material prior to deposition of the coating material on the exterior surface or article 10 to form the abradable layer. The coating material additive then may be melted or burned off in a subsequent heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in the abradable layer.

Figure 2:
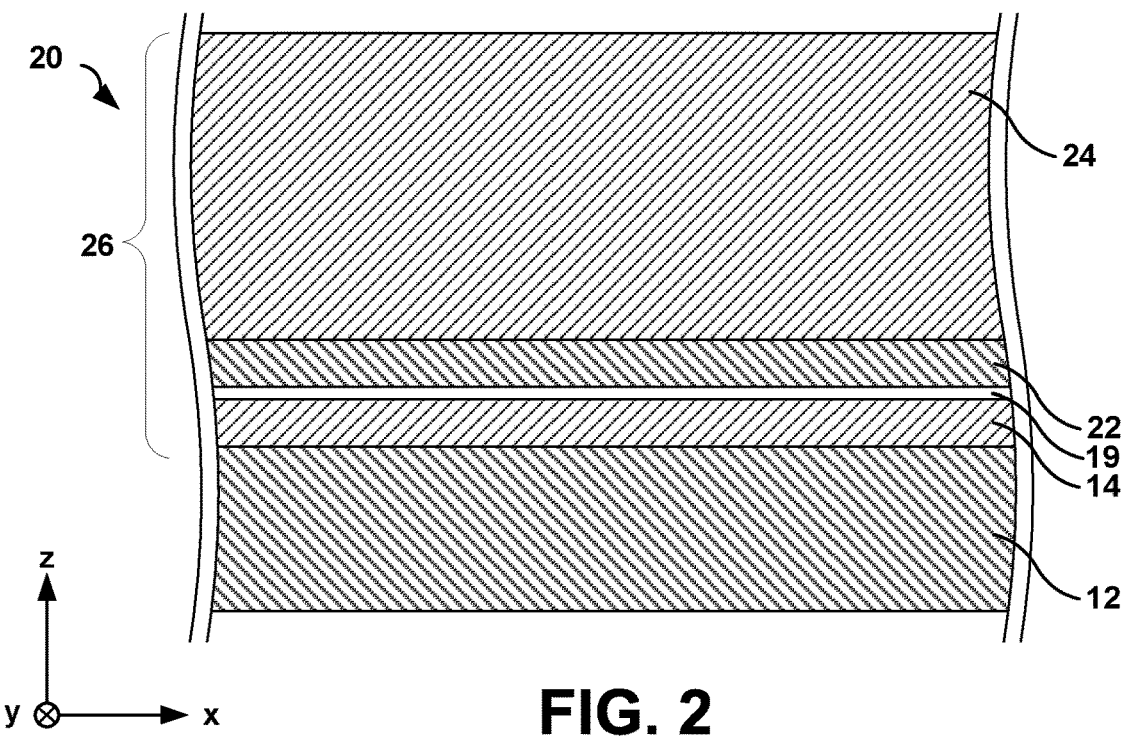
FIG. 2 is a cross-sectional diagram of another example article including an example bond layer.

FIG. 2 is conceptual illustration of another example article 20 that includes substrate 12 with a multi-layer coating 26 that includes bond layer 14 on substrate 12, a relatively dense EBC layer 22 on bond layer 14, and an abradable layer 24 on EBC layer 22.

EBC layer 22 and abradable layer 24 may be substantially the same as the EBC and abradable layer described above with respect to at least one additional layer 16. In some examples, EBC 22 may include a rare earth silicate and result in a layer that is substantially dense (e.g., substantially nonporous) and may provide protection to substrate 12 by preventing water vapor from contacting and reacting with substrate 12. In some examples, a layer with a substantially dense microstructure may have a porosity of less than about 30 vol. %, such as, e.g., less than about 10 vol. % or less than about 5 vol. %, where porosity is measured as a percentage of pore volume divided by total layer volume. The porosity may be measured by techniques such mercury porosimetry or optical image analysis, which can visually differentiate open and closed porosity. In some examples, EBC layer 22 define a thickness of about 10 μm to about 350 μm. Conversely, abradable layer 24 may be relatively porous (e.g., a void volume fraction of greater than about 30 vol. %, for example between about 10 vol. % and 50 vol. %, and define a thickness of about 150 μm to about 2500 μm.

Figure 3:
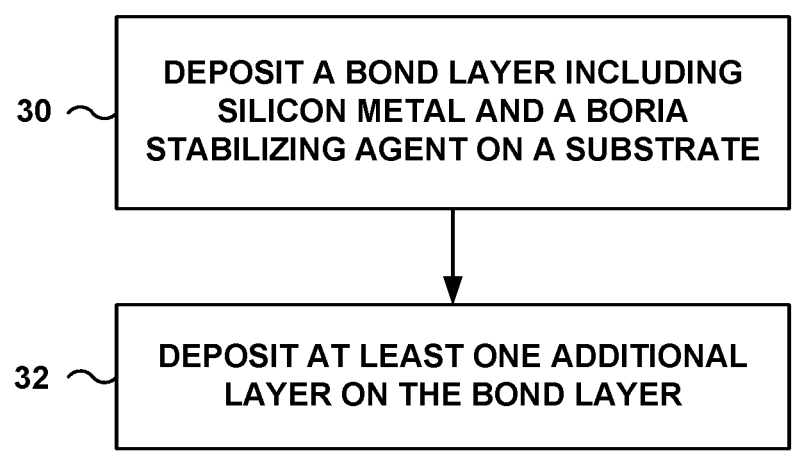
FIG. 3 is a flow diagram illustrating an example technique for forming an article that includes an example bond layer.

FIG. 3 is a flow diagram illustrating an example technique for forming article 10 or 20 that includes bond layer 14. While technique of FIG. 3 is described with concurrent reference to the conceptual diagram of FIG. 1, in other examples, the technique of FIG. 3 may be used to form another ceramic or CMC article, or articles 10 and 20 may be formed using a technique different than that described in FIG. 3.

FIG. 3 illustrates an example technique that includes depositing bond layer 14 on a substrate 12 (30). As described above, bond layer 14 may be formed using any one or more of a variety of techniques including, for example, CVD, PVD, slurry deposition, thermal spraying, or the like. Bond layer 14 may include silicon metal and a boria stabilizing agent (e.g., zinc silicate). In some examples, the boria stabilizing agent may be combined with the silicon metal (e.g., elemental silicon) in an amount of about 2 vol. % to about 40 vol. %.

The technique of FIG. 3 also includes forming at least one additional layer 16 on bond layer 14 (32). As described above, the at least one additional layer 16 may include an EBC layer, an abradable layer, a thermal barrier layer, a CMAS-resistant layer, or a combination thereof. Additional layer 16 may be formed using any one or more of a variety of techniques, including, for example, CVD, PVD, slurry deposition, thermal spraying, or the like.

Various embodiments of the invention have been described. These and other embodiments are within the scope of the following claims.

The invention claimed is:

1. An article comprising:
   a substrate comprising a ceramic or a ceramic matrix composite, wherein the substrate comprises at least one of boron, boria, or a boron-containing species that oxidizes to form boria;
   a bond layer on the substrate, wherein the bond layer comprises silicon metal and a boria stabilizing agent, wherein the boria stabilizing agent comprises a zinc silicate; and
   at least one additional layer on the bond layer.

2. The article of claim 1, wherein the at least one additional layer comprises an environmental barrier coating (EBC).

3. The article of claim 2, wherein the EBC comprises at least one of mullite, barium strontium aluminosilicate (BSAS), barium aluminosilicate (BAS), strontium aluminosilicate (SAS), a rare earth oxide, a rare earth silicate, an aluminosilicate, or an alkaline earth aluminosilicate.

4. The article of claim 2, wherein an outer surface of the EBC is abradable and comprises a porous microstructure having a void volume fraction of greater than about 10 percent by volume (vol. %).

5. The article of claim 2, wherein the at least one additional layer further comprises a porous abradable layer on the EBC having a void volume fraction of greater than about 15 percent by volume (vol. %).

6. The article of claim 1, wherein the coefficient of thermal expansion (CTE) of the bond layer is between about 2 parts per million per degree Celsius (ppm/° C.) and about 6 ppm/° C. at room temperature at room temperature.

7. The article of claim 1, wherein the bond coat further comprises at least one of zirconium silicate or hafnium silicate.

8. The article of claim 1, wherein the bond layer comprises between about 2 percent by volume (vol. %) to about 40 vol. % of the boria stabilizing agent.

9. The article of claim 1, wherein the substrate comprises boria.

10. A method comprising:
    forming a bond layer comprising silicon metal and a boria stabilizing agent on a substrate, the substrate comprising a ceramic or ceramic matrix composite and at least one of boron, boria, or a boron containing species that oxidizes to form boria, wherein the boria stabilizing agent comprises a zinc silicate; and
    forming at least one additional layer on the bond layer.

11. The method of claim 10, further comprising heating the substrate to cause the boron or the boron containing species to oxidize to form boria, the boria to diffuse from the substrate into the bond layer, and the boria to react with the boria stabilizing agent.

12. The method of claim 11, wherein the boria and the boria stabilizing agent react to form a metal-borosilicate glass.

13. The method of claim 12, wherein the boria stabilizing agent comprises zinc silicate and the metal-borosilicate glass comprises zinc borosilicate glass.

14. The method of claim 10, wherein the coefficient of thermal expansion (CTE) of the bond layer is between about 2 parts per million per degree Celsius (ppm/° C.) and about 6 ppm/° C. at room temperature.

15. The method of claim 10, wherein forming the bond layer comprises thermal spraying a mixture of silicon metal and the boria stabilizing agent on the substrate.

16. The method of claim 10, wherein forming the at least one additional layer on the bond layer comprises forming an environmental barrier coating (EBC) on the bond layer.

17. The method of claim 16, wherein forming the at least one additional layer further comprises forming an abradable layer on the EBC.

* * * * *